April 21, 1925.
H. MAINE
1,534,799
WIND POWER ENGINE
Filed Oct. 24, 1923
2 Sheets-Sheet 2
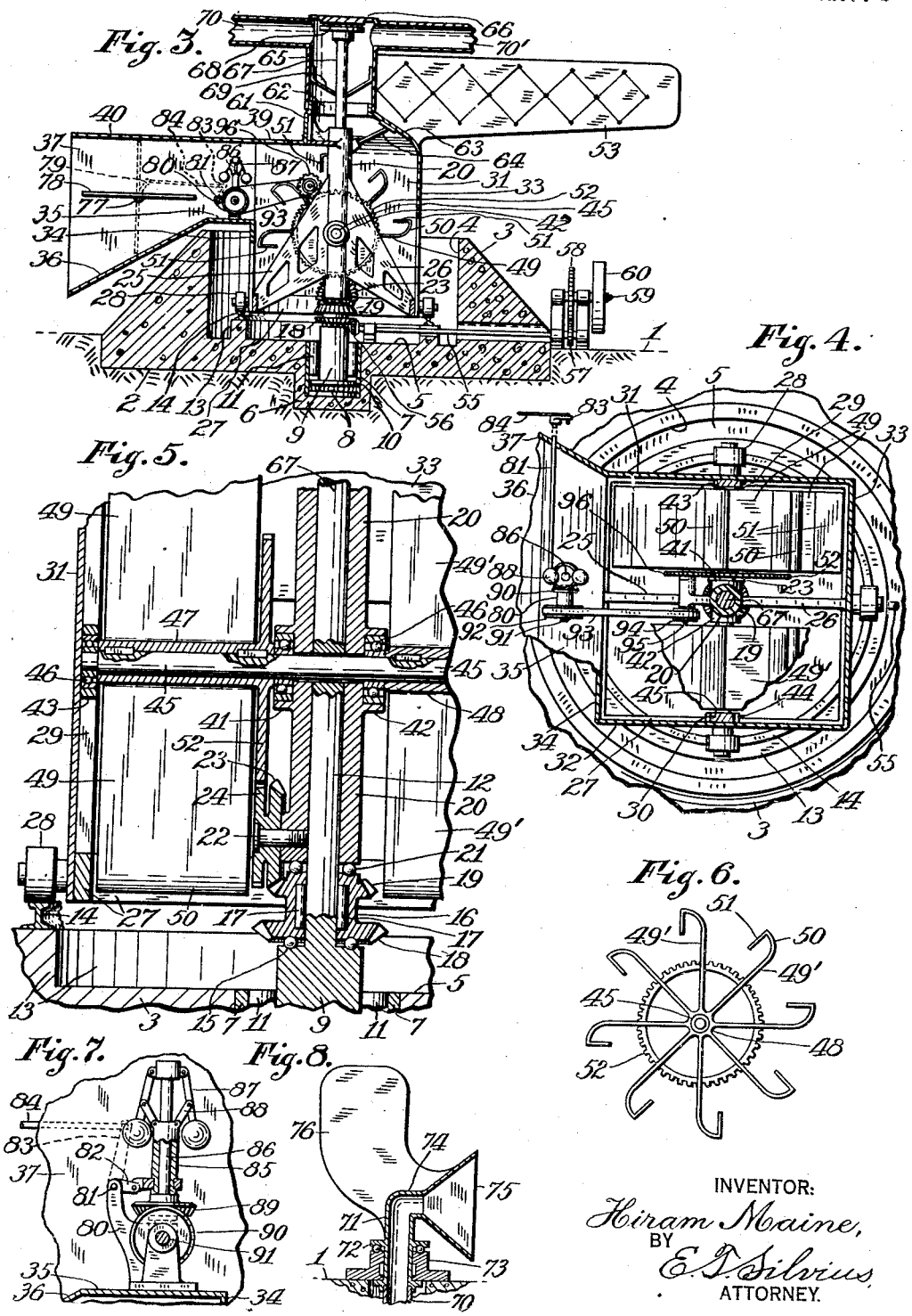
INVENTOR:
Hiram Maine,
BY
E. F. Silvius
ATTORNEY.

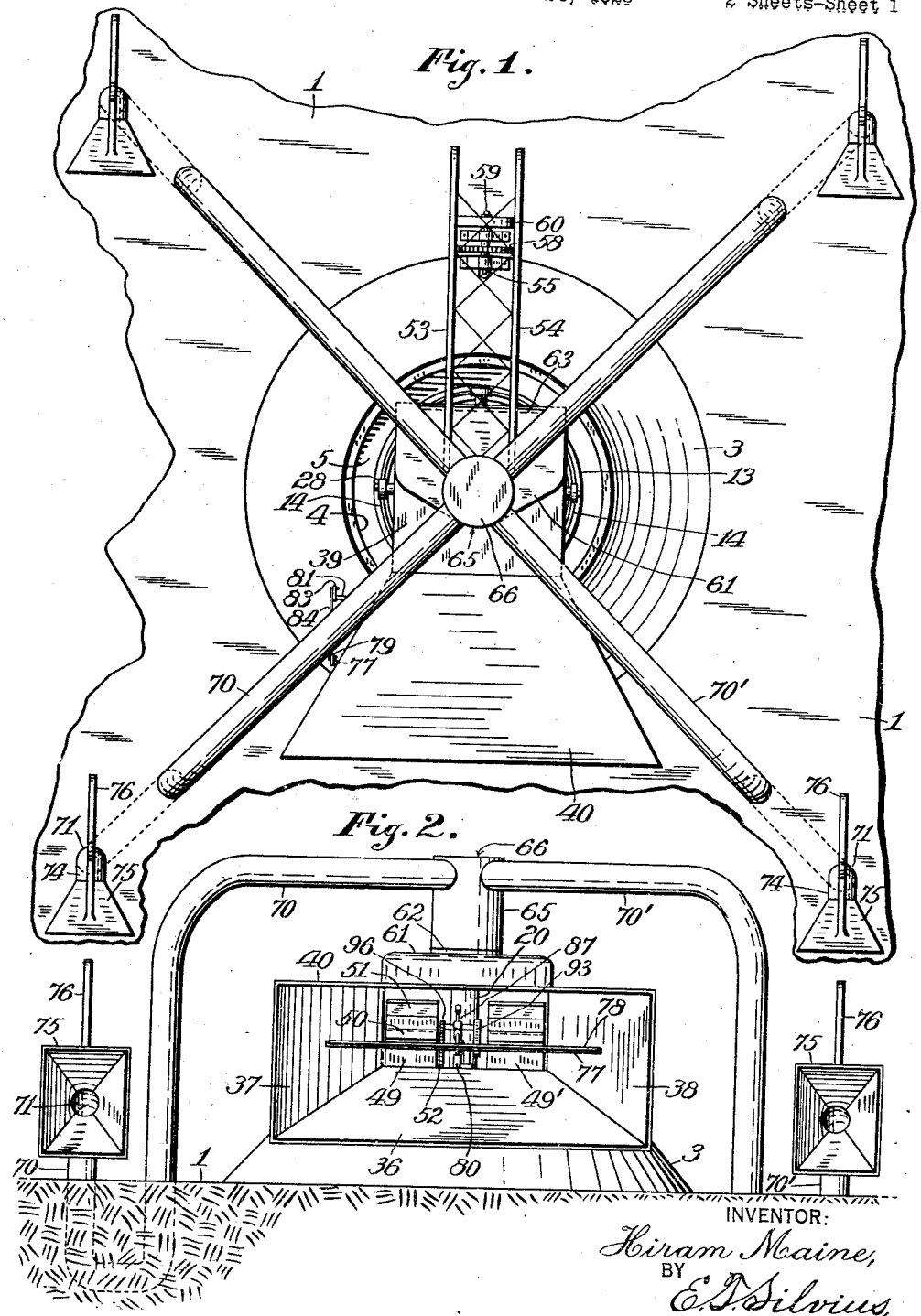

Patented Apr. 21, 1925.

1,534,799

UNITED STATES PATENT OFFICE.

HIRAM MAINE, OF INDIANAPOLIS, INDIANA.

WIND-POWER ENGINE.

Application filed October 24, 1923. Serial No. 670,420.

*To all whom it may concern:*

Be it known that I, HIRAM MAINE, a citizen of the United States, residing at Indianapolis, in the county of Marion and State of Indiana, have invented a new and useful Wind-Power Engine, of which the following is a specification, reference being had to the accompanying drawings and to the letters and figures of reference marked thereon.

This invention relates to a type of wind-power engine that is structurally designed for very high power duty, for industrial purposes generally, and it has reference more particularly to a wind-power engine of the class that has a wind-wheel arranged to rotate on a horizontal axis, and controlled to limit the speed to a safe degree during violent wind storms, being of the type that has a casing for controlling air currents, and guiding the currents to the wind-wheel, the casing being automatically adjusted by means of a tail vane.

An object of the invention is to provide a wind-power engine structure that may be of mammoth size so as to develop great power for various useful purposes, as for operating electric generators, more particularly when it is desired to store electric energy as a reserve power to be used during periods of inactivity of the wind-power engine due to lack of wind force.

Another object is to provide an improved wind-power engine which shall be so constructed as to control air currents for its operations in a highly efficient manner, and particularly so that pressure of air currents shall act on the maximum portion of the wind-wheel, and especially at and near the ends of wind-wheel wings and on the maximum number of wings of a wind-wheel.

A further object is to provide a high power engine and air current conductors and controllers of such construction as most effectively to utilize atmospheric air from wide area and on the greatest available portion of a wind-wheel, especially when the natural air currents are of low velocity, to enable the wind-wheel to perform its function with variable air currents.

A still further object is to provide an improved wind-power engine of the mammoth type, which shall be of such construction as to be capable of operation with the minimum frictional resistance and under various atmospheric conditions including snow storms, and not be liable to become damaged or deranged in operation, but which shall be of broad expanse and efficient and structurally adapted to take advantage of strong air currents which may occur at the ground surface, or in proximity thereto when higher air currents may be relatively rare and weak, which wind-power engine shall be strong and powerful, and durable and economical in use.

With the above-mentioned and other objects in view, the invention consists in a novel mammoth wind-power engine having controlling means of novel construction, including novel massive engine structure and gearing for the transmission of motion and power from the engine; and, the invention consists further in novel means for directing air currents to a wind-wheel to act thereon immediately following the action of direct air currents, the invention consisting also in the novel parts and in the combinations and arrangements of parts as hereinafter particularly described and further defined in the claims appended hereto.

Referring to the drawings,—Figure 1 is a top plan of a wind-power engine constructed substantially in accordance with the invention; Fig. 2 is an elevation of the wind-power engine; Fig. 3 is a sectional elevation, approximately central, of the wind-power engine; Fig. 4 is a fragmentary horizontal section of the wind-power engine on a plane above the wind-wheel thereof; Fig. 5 is a fragmentary vertical central section at right angles to that of Fig. 3, on an enlarged scale; Fig. 6 is an end view of the wind-wheel as preferably constructed; Fig. 7 is an enlarged detail view of a simple form of governor appearing on a smaller scale in other figures; and, Fig. 8 is a vertical sectional detail view of one of the appliances which preferably comprises an auxiliary part of the engine to direct supplemental air currents to the wind-wheel in a novel manner.

Similar reference characters in the various figures of the drawings indicate corresponding elements or features of construction herein referred to in detail.

In the drawings the numeral 1 indicates the ground level and 2 the bottom of an excavation in the ground in which a base 3 is erected, being preferably monolithic concrete or masonry work. The base is conical externally and has a pit therein which has a vertical annular wall 4 and a bottom 5, the bottom being provided with a sub-pit 6 centrally arranged and provided with a tubular metallic wall lining 7. A suitable frame is provided for supporting the necessary machinery and preferably comprises an anti-friction bearing 8 arranged in the sub-pit, and vertically supporting a center shaft comprising a large base portion 9 having a flange 10 directly arranged on the bearing, there being bearing rollers 11 arranged about the shaft to operate against the lining 7. The center shaft has a stem 12 that is diametrically smaller than the base portion 9 and extends upward from the top of the latter. The bottom 5 of the pit has an annular track bed 13 thereon which supports a circular track rail 14 which is concentric to the center shaft. The top of the main portion 9 of the shaft supports suitable anti-friction bearing devices 15 which bodily support a hub 16 that is rotatably guided on the stem portion 12 of the shaft, being preferably provided with bearing rollers 17 arranged about the stem. The lower end of the hub has a bevel gear wheel 18 thereon facing downwardly and the upper end of the hub has an upwardly facing bevel gear wheel 19 thereon. Preferably the center shaft comprises a hollow external part 20 suitably fixed to the stem portion 12 and extending downward nearly to the hub 16, anti-friction bearing devices 21 preferably being arranged between the upper end of the hub and the lower end of the part 20. A stub axle 22 is horizontally secured to the center shaft and rotatably supports a bevel gear wheel 23 that meshes with the wheel 19 and has a spur tooth pinion 24 fixed thereto, being parts of transmission gearing. The outer part 20 of the shaft has arms 25 and 26 fixed thereto that are secured to a bottom frame 27 which is provided with a suitable number of wheels or rollers 28 arranged to roll on the track 14 to prevent tilting of the frame. The frame has upright posts 29 and 30 fixed thereon on opposite sides of the center shaft, and a casing is provided which comprises two side walls 31 and 32 connected to the posts respectively, and to the bottom frame, a back plate 33 connected to the side walls at a suitable distance above the bottom frame so as to provide an outlet opening, a front plate 34 connected to the side walls with the top thereof slightly higher than the top of the base wall, a mouth lip 35 extending outward from the top of the front plate, an inclined plate 36 connected with the outer edge of the plate 35 and extending downward over the base and towards the ground, two cheek plates 37 and 38 connected to the walls 31 and 32 respectively, and extending there from divergently and downward to the inclined plate to which they are connected, and top plates 39 and 40 connected to the tops of the cheek plates and also the side walls, extending to the center post, a mouth and throat thus being provided as a main air-inlet to the casing.

In accordance with the preferred construction a divided wind-wheel or pair of wind-wheels having an axial shaft in common preferably is designed since the shaft may have great length requiring support intermediately of its ends, and accordingly the center post is of suitable height and provided with journal boxes 41 and 42, the posts 29 and 30 being provided with journal boxes 43 and 44, and a shaft 45 is rotatably supported in all the journal boxes. the shaft extending horizontally through the center shaft. Preferably each journal box has anti-friction bearing devices 46 therein. Two hubs 47 and 48 are secured to the shaft 45 on opposite sides respectively of the center shaft, one hub having a suitable number of wind-wheel wings or blades 49 fixed thereto, the companion hub having similar wings or blades 49′ thereon. Preferably each wing or blade has a curved end portion 50 extending over so as to form a pocket at the rear of the wing, a wing section 51 being connected to the end of the curved portion and extending inwardly so as to tend to retain air currents in contact with the ends of the wings. One of the wheel hubs has a gear wheel 52 fixed thereto that meshes with the pinion 24, being a part of the transmission gearing.

For holding the mouth of the casing to the wind a suitable tail vane is secured to the top of the casing and preferably is composed of two parts 53 and 54 of suitable length spaced apart and suitably braced one to another and fixed substantially to the casing, obviously proper braces being omitted from the drawings.

The transmission gearing, as shown for descriptive purposes further comprises a shaft 55 horizontally arranged and rotatably supported upon the bottom 5 of the pit in the base and has a bevel pinion 56 fixed thereto in mesh with the gear wheel 18, the shaft extending under the rail 14 and through the wall of the pit, and is otherwise suitably supported and has a pinion or gear wheel 57 fixed thereto that meshes with a gear wheel 58 fixed on a shaft 59 rotatably arranged adjacent to the base, and provided with a driving wheel 60 of such type as may be desired.

In order that the engine may develop the maximum power a supplemental air-inlet is provided which comprises a distributing cap 61 fixed to the top plate 39 and extending over beyond the center post and connected to the side walls of the casing, the cap having a circular neck 62 and an inclined top 63 extending from the neck downwardly to the back plate 33, to direct air currents downwardly on the rearward portion of the windwheel beyond the effective force of currents entering the mouth of the casing above the axis of rotation of the wind-wheel. Preferably the inclined portion 63 has a brace 64 connected thereto and to the outer part 20 of the center post. A header is provided which comprises a hollow cylindrical portion 65 that is loosely connected with the neck 62 and has a top 66 thereon that is supported upon a stem part 67 that is fixed to the outer part 20 of the center shaft, there being anti-friction bearing devices 68 between the head and the stem part, so that the casing may freely rotate while the header remains stationary. The header extends higher than the top of the tail vane and may have guides 69 therein arranged to co-operate with the stem part 67 to guide the header without depending upon the neck 62 for guidance. The header is free from connection with the tail vane. A suitable number of conduits 70, 70', are connected to the header, the conduits extending outward beyond the tail vane and the casing mouth and may extend downward and under ground any desired distance and thence upward above the ground, each conduit having a stand-pipe 71 swiveled thereto by suitable means, being preferably provided with a flange 72 rotatably supported upon a base 73 arranged upon the ground surface and connected with the conduit, the upper end of the stand-pipe having a horizontal throat portion or elbow 74 thereon to which the smaller end of a funnel-like mouth piece 75 is connected, each stand-pipe being provided with a tail vane 76 to guide and hold the mouth piece to the wind.

To guard against excessive speed of the wind-wheel in a violent storm a suitable regulator is provided which comprises a shaft 77 horizontally supported by the cheek plates 37 and 38 of the casing mouth, a shutter 78 being secured to the shaft within the mouth, the shaft extending through one cheek plate and having an arm 79 fixed thereto. A governor stand 80 is fixed upon the lip plate 35 and supports a rock-shaft 81 that extends also through the cheek plate and has an arm 82 fixed thereto adjacent to the stand, and another arm 83 fixed to the outer end thereof, and a connecting rod 84 is pivotally connected with the arms 79 and 83, for control of the shutter. The arm 82 is suitably connected with a sleeve 85 on a stem 86 that is rotatably supported by the stand 80 and has governor arms 87 pivoted thereto, links 88 being connected with the arms and the sleeve. The stem has a bevel gear wheel 89 fixed thereon that meshes with a bevel wheel 90 fixed on the shaft 91 that is supported by the stand, the shaft having a wheel or pulley 92 fixed thereon to be suitably driven by the wind-wheel, preferably by means of a belt 93 connected with the pulley and with a pulley 94 fixed on a shaft 95 rotatably supported upon the arm 25 of the wind wheel frame and having a gear wheel or pinion 96 fixed thereto in mesh with the gear wheel 52. The governor and connections for operating it are to be constructed and adjusted so that in case the wind-wheel is driven at undesirably high speed, the governor arms will be forced apart and cause the regulator shutter to partially close the mouth of the casing, thus preventing the full force of wind from entering the casing to the wind-wheel, the governor acting oppositely when the wind subsides.

In practical use, the engine tail vane guides the wind-wheel casing so as to keep the inlet mouth thereof to the wind, the base 3 preventing air currents from passing to the lower portion of the wind-wheel. Strong ground currents are directed by the mouth plate 36 upward into the casing, while the cheek plates 37 and 38 draw in horizontal currents and tend to cause compression of the air in the throat and increase of velocity and force as the air strikes the wing sections 51 as they pass above the front plate 34. Regardless of the direction of the air currents atmospheric air enters one or more of the mouth pieces 75 and passes through the conduit to supplement the force of the direct air currents, the auxiliary currents being discharged against the wings as they pass from beneath the top plate 39 of the casing. The spent air passes out of the lower portion of the casing into the pit into which the air can expand, passing thence over the top of the pit wall, some of the air being permitted to pass under the back plate 33 above the top of the pit wall. Normally the regulator shutter 78 rests horizontally without materially obstructing the air currents passing into the casing. The shutter is automatically adjusted variably to close the mouth or partially close it as a result of the operation of the governor at high speed in case the wind-wheel is driven at dangerously high speed by a storm wind. When the winds are mild the engine may still be operated with considerable effect since the wind-wheel is acted upon by the air currents on approximately one-half of the wind-wheel, the air fed or conducted through the top of the casing exerting force downward on the rearward side of the wind-wheel, the air currents being retained by the wing pockets until the force of the current is spent. Motion and power is to be transmitted from the driving wheel 60 to any desired machinery, an electric generator feeding a storage battery being suitably driven by the wind-power engine.

What is claimed as new is:—

1. A wind-power engine including a wind-wheel and a horizontal axial shaft therefor, a casing having a frame rotatably supporting the axial shaft provided with a vertical axis of rotation, a tail vane on the casing, and an annular wall extending about the casing and frame below the axis of the shaft concentric to the vertical axis of rotation, the outer face of the wall being conically inclined.

2. A wind-power engine including a rotatable frame, a casing on the frame having an apertured top, the top having a header thereon to direct air currents through the aperture in the top, a tail vane on the frame, a mouth structure connected with the casing, a wind-wheel having a horizontal axial shaft rotatably supported by the frame, and a plurality of conduits for air extending over the frame and connected with the header.

3. A wind-power engine including a casing having a vertical axis of rotation and a main air-inlet in one side and air-outlet opening in the opposite side thereof, the casing having also a supplemental air-inlet in the top thereof provided with an air-conducting header adjacent to the side having the outlet opening, a tail vane secured to the casing adjacent to the header, and a wind-wheel having a horizontal axis of rotation in the casing and wings movable past the main air-inlet and thence past the supplemental air-inlet and also past the air outlet opening.

4. A wind-power engine having a casing provided with a main air-inlet and a supplemental air-inlet, and a plurality of conduits leading to the supplemental air-inlet and provided with large mouth-pieces that are swiveled on the inlet ends of the conduits respectively, each mouth-piece having a tail vane thereon, a tail vane fixed to the casing, and a wind-wheel rotatable in the casing opposite to the air inlets.

5. A wind-power engine including a permanent base having an annular wall thereon, the wall having a conical outer face, a casing rotatable on the base centrally of the wall and extending higher than the wall, the casing having an inlet mouth structure carried above the wall on one side of its upper portion and an outlet opening in the lower portion of the opposite side thereof, a tail vane secured to the casing above the outlet opening therein, and a wind-wheel rotatably mounted in the casing.

6. A wind-power engine including a massive base having a pit therein and a conical external face, a frame rotatably supported in the pit with a vertical axis of rotation and having a casing thereon extending upward beyond the top of the pit, the upper portion of the casing having an inlet mouth structure on its front above the top of the pit, the structure extending out beyond the base, a tail vane fixed to the back portion of the frame and the casing, and two wind-wheels having a single axial shaft rotatably supported horizontally by the frame on a plane approximately at the top of the base.

7. A wind-power engine including a base having an annular side wall, a vertical center shaft rotatably supported in the base and having a frame fixed thereto, the frame being provided with a casing fixed thereon and having an inlet-mouth and an outlet opening in opposite sides respectively thereof, the inlet-mouth being higher than the top of the side wall, a tail vane secured to the casing above the outlet opening, and two wind-wheels in the casing on opposite sides respectively of the center shaft and provided with an axial shaft common to both and journaled in the center shaft and the frame.

8. A wind-power engine including a frame having a vertical axis of rotation, a casing on the frame having a mouth structure on one side and an outlet in the opposite side, thereof, a circular wall extending under the mouth structure and about the frame, a wind-wheel having an axial shaft rotatably supported horizontally by the frame within the casing, a speed-governor bodily supported by the mouth structure and having gearing connection with the wind-wheel, a shutter movably supported in the mouth structure and having connection with the speed governor to be operated thereby, and a tail vane on the casing opposite to the mouth structure.

9. A wind-power engine including a vertical rotary center shaft and a frame fixed thereto, two separate wind-wheels on opposite sides of the center shaft and having a single horizontal axial shaft extending through the center shaft, the axial shaft having rotary support in the center shaft and in the frame, a casing on the frame having an inlet mouth structure on one side and an outlet in the opposite side thereof, a tail vane on the casing above the outlet therein, an annular wall extending under the mouth structure and about the frame and up approximately as high as the line of the axial shaft, and gearing having connection with the axial shaft to transmit motion therefrom and outward beyond the wall.

10. In a wind-power engine, the combination, with a permanently vertical center shaft, a frame connected with and rotatable about the shaft, and a permanent circular wall extending about the frame, of a windwheel rotatably supported by the frame with the axis of the wind-wheel horizontal and approximately on the plane of the top of the wall, and a casing on the frame having a mouth structure on one side thereof extending outward above the top and partially downwardly outside of the wall.

11. In a wind-power engine, the combination, with a base, a center shaft vertically supported by the base, and a circular wall extending concentrically about the center shaft, of a circular track rail secured on the base concentric to the center shaft, a frame rotatably guided by the center shaft and the track rail and having a flared inlet mouth structure thereon extending outward above the top of the wall, and two wind-wheels rotatably supported by the center shaft and the frame approximately on the plane of the top of the wall.

12. In a wind-power engine, the combination of a wind-wheel having a horizontal axis of rotation and a casing therefor having a vertical axis of rotation, a flared mouth structure connected to the front of the casing to direct air currents to the upper forward portion of the wind-wheel, and means connected with the rearward portion of the top of the casing to gather atmospheric air from different points and direct air currents downwardly to the upper rearward portion of the wind-wheel.

13. In a wind-power engine, the combination, with a frame having a vertical axis of rotation, of a wind-wheel rotatably supported with its axis horizontal in the frame, a circular wall extending about the frame, a casing fixed on the frame and having an air-inlet mouth in one side thereof and also a supplementary air-inlet in the top of the casing adjacent to the top of the opposite side thereof, and means to conduct air currents from different distant points to the supplementary air-inlet.

14. In a wind-power engine, the combination, with a base and a circular wall, of a center shaft vertically supported by the base centrally of the wall, a frame rotatable about the center shaft and having a casing thereon provided with an inlet mouth structure on one side thereof extending outward over the wall, the mouth structure having a bottom extending downwardly at an inclination outside the wall, and a wind-wheel rotatably supported by the frame approximately on the plane of the top of the wall.

15. In a wind-power engine, the combination, with a base, a frame rotatably mounted on the base with a vertical axis, and a wind-wheel having an axial shaft horizontally supported rotatably by the frame, of a circular wall on the base extending about the frame and upward approximately to the line of the axial shaft, the wall having an inclined outer face, and a casing for the wind-wheel secured to the frame and provided with an air-inlet mouth structure having a bottom extending over the wall and downwardly adjacent to the outer face of the wall.

16. In a wind-power engine, the combination, with a stationary base, a frame having a vertical center shaft to rotatably guide the frame, and a wind-wheel having an axial shaft horizontally supported by the frame, of a casing for the wind-wheel secured to the frame and having a top provided with an air-inlet opening adjacent to the rear side of the casing, the casing having an opposite front side provided with an air-inlet opening in the upper portion thereof, and two separate series of means for gathering air and directing air currents into the air-inlet openings respectively.

17. In a wind-power engine, the combination, with a casing having an air-inlet mouth in the upper portion of one side thereof and an outlet opening in the lower portion of the opposite side thereof, of means rotatably to support the casing with a vertical axis of rotation, and a wind-wheel having an axial shaft horizontally supported rotatably in the casing, the wind-wheel comprising wings fixed to the shaft and having each a curved portion adjacent to its end presenting a concave face to air entering said mouth in operation, the end of the curved portion having a wing section fixed thereon and extending inwardly towards the base portion of the next adjacent one of the wings.

18. In a wind-power engine, the combination, with a casing having an air-inlet mouth in its front side and an outlet opening in its opposite rearward side, and means to rotatably support the casing with a vertical axis of rotation, of a wind-wheel comprising wings having an axial shaft horizontally supported rotatably in the casing, a cap fixed to the top of the casing and adapted to direct air currents downward towards the rearward portion of the wind-wheel and the interior of the casing, a stationary header loosely connected with the cap and permitting rotary movement of the casing and the cap, and a plurality of conduits for air connected to the header and extending away distantly therefrom, the end of each conduit having an intake mouth-piece swiveled thereto, the mouth-piece being provided with a guiding tail vane.

19. In a wind-power engine, the combination of a base and a circular wall thereon, the middle portion of the base having a pit therein, a center shaft rotatably supported vertically in said pit, a circular track rail supported by the base concentrically to the center shaft, a frame secured to the center shaft and provided with wheels supported upon the track rail, a casing secured to the frame and having an inlet and an outlet for air, a pair of wind-wheels having a single axial shaft extending horizontally through the center shaft, the wind-wheels comprising wings on opposite sides of the center shaft, bearings supported by the center shaft and rotatably supporting the axial shaft, bearings supported by opposite portions of the frame and rotatably supporting the opposite ends respectively of the axial shaft, a gear wheel fixed to the axial shaft, a bevel gear wheel and a spur tooth pinion connected together and rotatably mounted on one side of the center shaft, the pinion meshing with said gear wheel, a hub rotatably mounted on the center shaft and having an upward-facing bevel pinion in mesh with said bevel gear wheel, the lower end of the hub having a downward-facing bevel gear wheel thereon, a transmission shaft rotatably supported by the base and extending under said track rail and through said wall, and a bevel pinion secured to the transmission shaft in mesh with said downward-facing gear wheel.

In testimony whereof, I affix my signature on the 15th day of October, 1923.

HIRAM MAINE.